United States Patent
McGrath et al.

(10) Patent No.: US 7,191,172 B2
(45) Date of Patent: Mar. 13, 2007

(54) FUZZY LOCATION OF A TESTABLE OBJECT IN A FUNCTIONAL TESTING TOOL

(75) Inventors: Frank McGrath, Wellesley, MA (US); Mark Metheny, Shirley, MA (US); William C. Tobin, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 10/745,821

(22) Filed: Dec. 23, 2003

(65) Prior Publication Data

US 2004/0194065 A1    Sep. 30, 2004

Related U.S. Application Data

(60) Provisional application No. 60/457,631, filed on Mar. 25, 2003.

(51) Int. Cl.
    *G06F 17/30* (2006.01)
(52) U.S. Cl. .......................................................... 707/2
(58) Field of Classification Search .................... 707/1, 707/2, 9, 10, 200; 709/223; 714/38
    See application file for complete search history.

(56) References Cited

U.S. PATENT DOCUMENTS

| | | | | |
|---|---|---|---|---|
| 5,452,442 A | * | 9/1995 | Kephart ........................ | 714/38 |
| 5,790,117 A | * | 8/1998 | Halviatti et al. ............. | 715/744 |
| 2003/0131088 A1 | * | 7/2003 | Morrissey et al. .......... | 709/223 |

* cited by examiner

*Primary Examiner*—Etienne P. LeRoux
(74) *Attorney, Agent, or Firm*—C. Steven Kurlowecz, Esq.; Steven M. Greenberg, Esq.; Carey Rodriguez Greenberg & Paul LLP

(57) ABSTRACT

A method, system and apparatus for locating a testable object in a functional testing tool is provided. The system can include a record process configured to produce both a test script and an object mapping, and a playback process configured to process the test script. An object manager can be coupled to the playback process and configured to locate among candidate objects in a GUI, a candidate object having a set of properties which partially matches another set of properties associated with a corresponding test object in the object mapping.

22 Claims, 2 Drawing Sheets

FUZZY LOCATION OF A TESTABLE OBJECT IN A FUNCTIONAL TESTING TOOL

CROSS-REFERENCE TO RELATED APPLICATIONS

This patent application claims the benefit under 35 U.S.C. § 119(e) of now abandoned U.S. Provisional Patent Application No. 60/457,631, entitled LOCATING A TESTABLE OBJECT IN A FUNCTIONAL TESTING TOOL, filed on Mar. 25, 2003, the entire teachings of which are incorporated herein by reference.

BACKGROUND OF THE INVENTION

1. Statement of the Technical Field

The present invention relates to the field of software functional testing and more particularly to locating a testable object in a functional testing tool.

2. Description of the Related Art

Software functional testing relates to the functional testing of a graphical user interface (GUI) coupled to an underlying software application. Conventional functional testing tools allow the end user to create, modify and run functional, distributed functional, regression and smoke tests for applications built using any of a wide variety of integrated development environments. In this regard, the conventional functional testing tool can generate a test script for a GUI in which elements of the GUI can be exercised both sequentially and conditionally. Through a thorough testing of the GUI of an application, the functional testing tool can automatically identify defects early, often and repeatably.

In operation, the conventional functional testing tool can monitor and record the interaction between end user and GUI during a recording phase of functional testing. In this regard, a testing script can be produced based upon the identity of GUI elements addressed by the end user and the sequence in which the GUI elements are addressed. Within the script, GUI elements, referred to herein as "objects", can be identified by absolute reference to each object. The absolute reference can include any number of element properties which, when combined with one another, can uniquely identify the desired object. Properties can include any explicit object property such as a data or method member, or any metadata associated with the object. Examples can include the class index, the accessible role, the object position, associated text, class name, and child and parent element identity, just to name a few.

Yet, the skilled artisan will recognize the inherent danger in absolutely identifying an object. Specifically, during the course of developing an application, the properties of an object can change as elements are added, modified and deleted from the application. Moreover, ambiguities can arise where the uniqueness of a GUI related object is dissolved as a result of an added, modified or deleted object. Consequently, an absolute reference to an object in the GUI can be rendered invalid and unresolvable in the face of application modifications. Therefore, the script generated to exercise the GUI suddenly can become inoperable.

To address the foregoing deficiencies several popular functional testing tools have augmented the number of properties available to uniquely identify a GUI element. By increasing the number of possible combinations of GUI element properties, it is presumed that uniquely specifying a GUI element merely is a matter of selecting enough properties in combination with one another such that no other GUI element is likely to be confused with the intended GUI element. Nevertheless, requiring the specification of a GUI element with a combination of a multiplicity of properties can exacerbate the problem of identifying a GUI element during the testing phase. That is to say, a mere slight modification to the GUI of an application under test can result in no GUI elements in the GUI satisfying the unique combination of the multiplicity of properties.

SUMMARY OF THE INVENTION

The present invention is a system, method and apparatus for fuzzily locating a testable object in a functional testing tool. In accordance with the inventive arrangements, mapped objects relied upon by the functional testing tool in executing a testing script can be located in the software application under test through a "fuzzy" matching process (requiring less than a perfect match). In particular, the fuzzy matching process of the present invention, absolute matches between candidate objects and mapped objects are not required to resolve the location of the mapped object in the GUI of the software application under test. Rather, an imperfect match between candidate objects and mapped objects can be used to resolve the location of the mapped object in the GUI of the software application under test. For example, in a preferred albeit non-exclusive aspect of the present invention, the candidate object having the highest weighted scoring of object properties when compared to the properties of the mapped object can be identified as the desired object.

In a preferred aspect of the invention, a method for locating a testable object in a functional testing tool can include establishing a value and a weighting for each of a selected group of properties for a test object in an object mapping. A value can be computed for at least one of the properties for a candidate object associated with a GUI for an application under testing. For each computed value, the computed value can be compared to a corresponding one of the established values to produce a score and weighting the score according to the established weight. Subsequently, the weighted scores can be summed to produce a candidate score. Finally, the testable object can be located based upon the candidate score.

A system for locating a testable object in a functional testing tool, by comparison, can include a record process configured to produce both a test script and an object mapping, and a playback process configured to process the test script. An object manager can be coupled to the playback process and configured to locate among candidate objects in the application under testing, a candidate object having a set of properties which partially matches another set of properties associated with a corresponding test object in the object mapping.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for fuzzily locating a testable object in a functional testing tool. In accordance with the inventive arrangements, mapped objects relied upon by the functional testing tool in executing a testing script can be located in the software application under test through a fuzzy matching process. In the fuzzy matching process of the present invention, absolute matches between candidate objects and mapped objects are not required to resolve the location of the mapped object in the GUI of the software application under test. Rather, an imperfect match between candidate objects and mapped objects can be used to resolve the location of the mapped object in the GUI of the software application under test.

Figure 1:
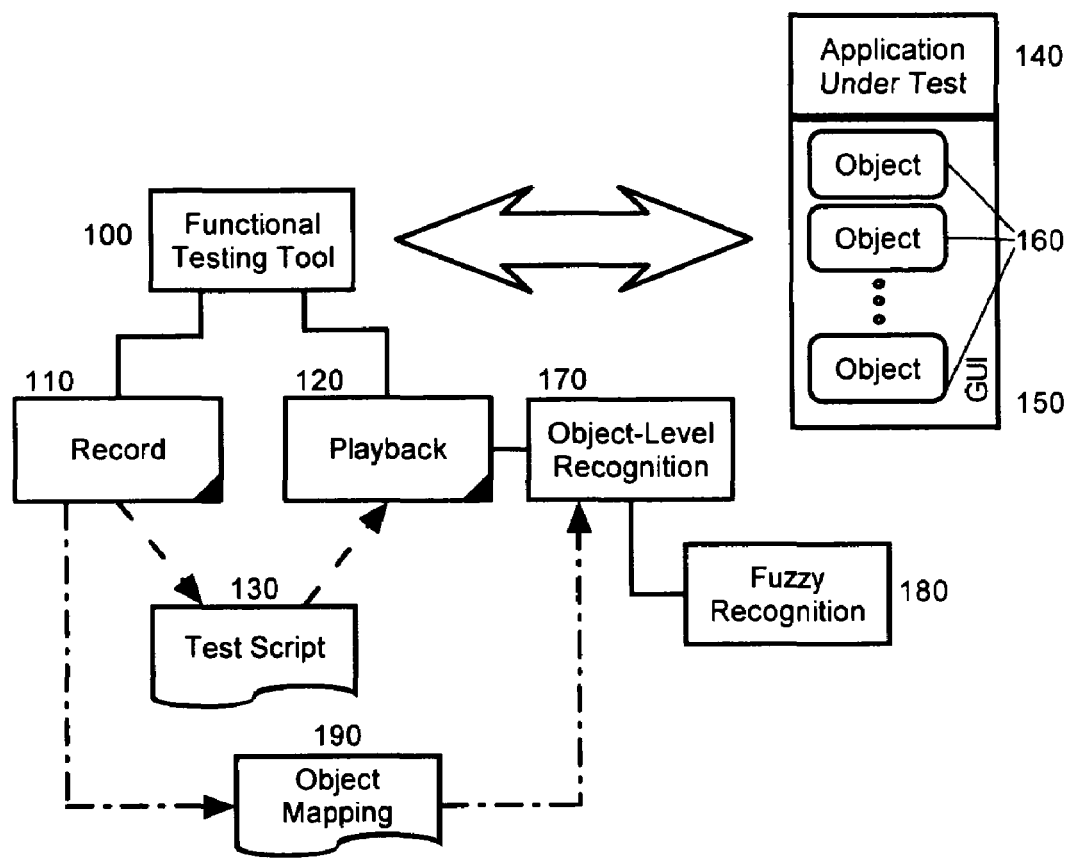
FIG. 1 is a pictorial illustration of a functional testing system which has been configured in accordance with the inventive arrangements; and, FIG. 2 is a flow chart illustrating a process for fuzzily locating a testable object in a functional testing tool.

FIG. 1 is a pictorial illustration of a functional testing system which has been configured in accordance with the inventive arrangements. The system can include a functional testing tool 100 configured to test the functionality of the GUI 150 of an application under test 140. Functional testing tools are well-known in the art and can include by way of example, the testing tool family of products produced by Rational Software of Lexington, Massachusetts, United States of America, now a division of International Business Machines Corporation of Armonk, New York, United States of America.

The functional testing tool 100 can test the GUI 150 of the application under test initially through a recording process 110. In the recording process 110, user interactions with objects 160 in the GUI 150 can be captured from which a test script 130 can be produced. The test script 130, in turn can be process by a playback process 120 to reproduce the interactions of the user with the objects 160 of the GUI 150. Typical interactions include mouse clicks depressing buttons, selecting list items and providing keyboard input to edit boxes, though the skilled artisan will recognize that the foregoing list of typical interactions hardly represents an exclusive listing. In any case, the test script 130 can include several categories of executable statements, including statements directing the emulation of user actions, statements for validating application states, and other miscellaneous statements such as a command for launching an application.

Importantly, an object manager configured to perform object-level recognition 170 can be included in the functional testing tool 100 with which objects 160 within the GUI 150 which are required for use by statements in the test script 130 can be located. More particularly, during the recording process 110, an object mapping 190 can be constructed for each object 160 implicated by the test script 130. The object mapping 190 can include mapped objects which represent one of a direct referring means, or an indirect means of accessing and managing objects 160 in the GUI 150. The mapped objects preferably can include properties and methods that enable the object manager 170 to recognize and manage objects 160 during the playback process 120.

In a preferred aspect of the present invention, a test object can be constructed which can include a reference to a corresponding object 160 in the GUI 150 of the application under test 140. The reference either can point directly to the object, or to a uniquely identified description. Where the reference points to a uniquely defined description, the reference can be included in the object mapping 190. To that end, the reference can include a collection of name/value pairs that describe the properties and expected values of an object 160 in the GUI 150. Thus, the object mapping 190 can be an approximate representation for the hierarchy of objects 160 in the GUI 150.

In one aspect of the present invention, the playback process 120 and the application under test 140 can reside in separate processes, data and control must be transferred between the processes. As such, when a method is invoked on an object 160 in the GUI 150, an object can be returned as will be understood by the skilled artisan. While certain returned objects can be considered values, other returned objects will not be considered values. Furthermore, while values can be easily passed between processes, non-values, for instance a button in the GUI 150, cannot be passed between processes without fundamentally altering the nature of the non-value object.

In consequence, in a preferred aspect of the present invention, when a method is invoked on an object 160 in the GUI 150 which results in the return of a non-value object, a remote reference to the non-value object can be established within the same type of structure as a test object. Furthermore, a remote object reference can be stored in the test object structure in lieu of storing an object description in the test object structure. The remote object reference itself can be maintained by the functional testing tool 100 until the user "unregisters" the test object storing the remote reference, the playback process 120 terminates, or the functional testing tool 100 itself is terminated.

Importantly, as the test object containing the remote object reference can behave as any other test object in the object mapping 190, methods can be invoked on the test object containing the remote object reference, which in turn can return other test objects. Moreover, as the test object containing the remote object reference can be stored in the object mapping 190, the object manager 170 need not search for the remote object in the GUI 150 as a direct reference remains in the object mapping 190. Thus, greater efficiencies can be enjoyed from the modeling of a remote object reference as a test object in the object mapping 190.

In operation, when a method is invoked on a test object by way of a statement in the test script 130, the object manager 170 can search the GUI 150 for an object 160 which at least partially matches a description of the invoked test object. Specifically, in lieu of searching for an object 160 in the GUI 150 which exactly matches the properties of an object reference by the test script 130 as would be the case in a conventional functional testing tool, in the functional testing tool 100 of the present invention, a fuzzy recognition system 180 can be provided. In the fuzzy recognition system, when required by the test script 130, weighted properties for the required object as noted in the object mapping 190 can be compared to the properties of candidate ones of the objects 160 located in the GUI 150. Each comparison can result in a score which can be aggregated for each candidate one of the objects 160. A highest scoring candidate can be selected as the required object without requiring an exact match.

Notably, a recognition threshold can be specified such that if the candidate object with the best recognition score is above the threshold, the candidate object can be rejected and the user can be notified that the required object has not been found in the GUI 150. Also, if no candidate object is found that has a recognition score falling below the specified recognition threshold, the execution of the test script 130 can pause before an attempt to locate a suitable candidate object can be repeated. Time parameters can be established to control the time between re-attempts and the maximum time permitted to search the GUI 150 for the object. Where no object can be located within the maximum permitted time, the search can be repeated a final time using a "last chance" recognition threshold.

Figure 2:
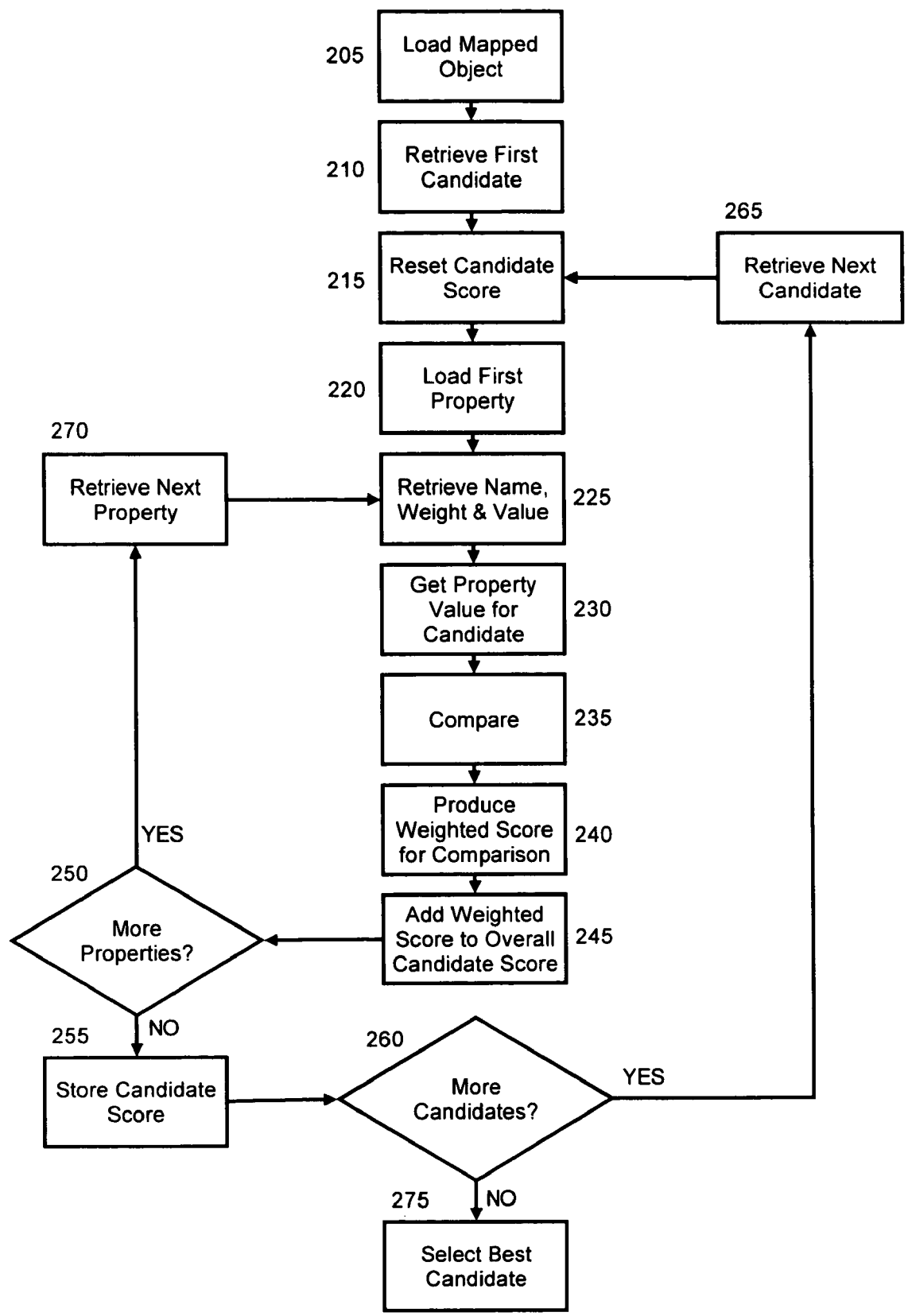

FIG. 2 is a flow chart illustrating a fundamental process for locating a testable object in the functional testing tool of FIG. 1. At the outset of the illustrated process, it is presumed that the object mapping produced during the recording process can include a hierarchy of test objects. Each test object in the hierarchy can represent an object in the GUI of the application under test as specified during the recording process associated with the test script. A similar set of proxies can be presumed which represent the candidate objects presently available for viewing in the GUI of the application under test.

Beginning in block 205, a mapped object in the object mapping can be loaded as specified by the test script. In block 210, a first candidate can be retrieved and in block 215, the cumulative score for the candidate can be reset. In block 220, a first property to be evaluated can be loaded. For example, a button can include five recognition properties: text, type, role, class and index. In block 225, the property name, weight and value as specified by the mapped object can be retrieved, as can the property value for the loaded candidate in block 230.

In block 235, the desired property value for the mapped object can be compared with the value of the property for the candidate object. In consequence of the comparison, in block 240 a score can be produced. In a preferred aspect of the invention, the score can range from 0 indicating an exact match, to 100 for a complete mismatch. The score further can be weighted according to the mapped object which weight can be indicative of the relative importance of the property in identifying the object. For instance, the weight can range from 0 to 100, where the name, type and role properties enjoy a weighting of 100, while the class recognition property enjoys merely a weighting of 50. Finally, in block 245 the weighted score can be added to the overall candidate score.

In decision block 250, if more properties remain to be evaluated, in block 270 the next property can be retrieved for evaluation. Subsequently, the process of blocks 225 through 250 can be repeated for the next property and the weighted score for the next property can be added to the overall candidate score. Where no further properties remain to be evaluated, in block 255 the overall candidate score can be stored for the candidate. Furthermore, in decision block 260 it can be determined whether any further candidates remain to be evaluated. If so, in block 265 the next candidate can be retrieved and the process of blocks 215 through 260 can be repeated. Once all candidates have been evaluated, in block 275 the candidate having the highest score can be selected as the best candidate. In this regard, the candidate with the lowest score is considered to be the best candidate.

In a preferred aspect of the invention, a recognition level can be configured to specify the level of sensitivity to which the object manager 170 of FIG. 1 matches a mapped object to a candidate object. For instance, the sensitivity can be selectively configured to range from strict (exact match required) to tolerant (somewhat similar properties required). Additionally, a warning level can be established in which warnings can be issued to the user where the differences between object and recognition properties varies above the established threshold. Finally, the user can configure the object manager 170 of FIG. 1 with specific thresholds for recognition scores which a test object must have or fall below to be considered as a candidate for recognition.

Significantly, it will be recognized by the skilled artisan that the process illustrated in FIG. 2 merely represents the simplistic case of searching the entirety of a GUI of an application under test for a single closest matching object within a single process. In a alternative aspect of the present invention, however, several resource optimizing techniques are to employed to accommodate the practical realities of a multi-threaded, multi-process design. Specifically, the candidate objects are placed in a priority queue in which the best scored candidate always remains at the front end of the queue. Only the most viable candidates are evaluated so as to avoid evaluating those candidates which, regardless of a particular property score, are unlikely to resolve to best candidate status. Furthermore, multiple properties can be evaluated in multiple threads, while other properties can be evaluated within a single thread. In this regard, where thread affinity subsists between a testable object and the property under evaluation, the property value must be acquired from the same thread in which the testable object resides.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for fuzzily locating testable objects in a functional testing tool, the method comprising the steps of:

comparing object properties for a mapped testable object to object properties for each of a set of candidate objects for an application under test in the functional testing tool; and, determining a best matching candidate object for said mapped object without requiring an exact match of said object properties in the functional testing tool.

2. The method of claim 1, wherein said comparing step comprises the step of comparing name/value pairs that describe properties and expected values of a mapped object to name/value pairs that describe properties and expected values for each of a set of candidate objects.

3. The method of claim 1, wherein said determining step comprises the step of determining a best matching candidate object for said object while requiring a matching of less than all object properties for said mapped object.

4. The method of claim 1, further comprising the step of constructing an object mapping for each object implicated by a test script configured for processing in the functional testing tool.

5. The method of claim 4, wherein said constructing step further comprises the step of constructing an object mapping having mapped objects which represent one of a direct referring means and an indirect means of accessing and managing objects in a graphical user interface of an application under test.

6. The method of claim 1, further comprising the step of invoking a method member in said best matching candidate object, said invocation producing one of a return non-value object and a return value object.

7. The method of claim 6, further comprising the steps of:
responsive to said invocation, obtaining a remote reference to a return non-value object; and,
establishing said reference in a data structure corresponding to a data structure to which return value objects conform.

8. The method of claim 7, further comprising the step of registering said reference in the functional testing tool.

9. The method of claim 8, further comprising the step of maintaining said reference until one of said reference becomes de-registered, a playback process associated with said registration terminates, and a termination of operation of the functional testing tool.

10. A method for locating a testable object in a functional testing tool, the method comprising the steps of:
establishing a value and a weighting for each of a selected group of properties for a test object in an object mapping;
computing a value for at least one of said properties for a candidate object in a graphical user interface for an application under testing;
for each computed value, comparing said computed value to a corresponding one of said established values to produce a score and weighting said score according to said established weight;
summing said weighted scores to produce a candidate score; and, locating the testable object based upon said candidate score in the functional testing tool.

11. A system for fuzzily locating a testable object in a functional testing tool, the system comprising:
a record process configured to produce both a test script and an object mapping in the functional testing tool;
a playback process configured to process said test script in the functional testing tool; and,
an object manager coupled to said playback process and configured to locate among candidate objects in a graphical user interface, a candidate object having a set of properties which partially matches another set of properties associated with a corresponding test object in said object mapping in the functional testing tool.

12. The system of claim 11, wherein said object manager comprises a fuzzy recognition processor programmed to perform partial matching of said candidate object with said corresponding test object in said object mapping.

13. A machine readable storage having stored thereon a computer program for locating testable objects in a functional testing tool, the computer program comprising a routine set of instructions which when executed by the machine cause the machine to perform the steps of:
comparing object properties for a mapped testable object to object properties for each of a set of candidate objects for an application under test in the functional testing tool; and,
determining a best matching candidate object for said mapped object without requiring an exact match of said object properties in the functional testing tool.

14. The machine readable storage of claim 13, wherein said comparing step comprises the step of comparing name/value pairs that describe properties and expected values of a mapped object to name/value pairs that describe properties and expected values for each of a set of candidate objects.

15. The machine readable storage of claim 13, wherein said determining step comprises the step of determining a best matching candidate object for said object while requiring a matching of less than all object properties for said mapped object.

16. The machine readable storage of claim 13, further comprising the step of constructing an object mapping for each object implicated by a test script configured for processing in the functional testing tool.

17. The machine readable storage of claim 16, wherein said constructing step further comprises the step of constructing an object mapping having mapped objects which represent one of a direct referring means and an indirect means of accessing and managing objects in a graphical user interface of an application under test.

18. The machine readable storage of claim 16, further comprising the step of invoking a method member in said best matching candidate object, said invocation producing one of a return non-value object and a return value object.

19. The machine readable storage of claim 18, further comprising the steps of:
responsive to said invocation, obtaining a remote reference to a return non-value object; and,
establishing said reference in a data structure corresponding to a data structure to which return value objects conform.

20. The machine readable storage of claim 19, further comprising the step of registering said reference in the functional testing tool.

21. The machine readable storage of claim 20, further comprising the step of
maintaining said reference until one of said reference becoming de-registered, a playback process associated with said registering step terminates, and a termination of operation of the functional testing tool.

22. A machine readable storage having stored thereon a computer program for locating a testable object in a functional testing tool, the computer program comprising a routine set of instructions which when executed by the machine cause the machine to perform the steps of:
establishing a value and a weighting for each of a selected group of properties for a test object in an object mapping;

computing a value for at least one of said properties for a candidate object in a graphical user interface for an application under testing;

for each computed value, comparing said computed value to a corresponding one of said established values to produce a score and weighting said score according to said established weight;

summing said weighted scores to produce a candidate score; and, locating the testable object based upon said candidate score in the functional testing tool.

* * * * *